(12) United States Patent
Shepherd et al.

(10) Patent No.: US 8,290,999 B2
(45) Date of Patent: Oct. 16, 2012

(54) AUTOMATIC UPDATE OF ONLINE SOCIAL NETWORKING SITES

(75) Inventors: Michael D. Shepherd, Ontario, NY (US); Dale E. Gaucas, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 214 days.

(21) Appl. No.: 12/546,044

(22) Filed: Aug. 24, 2009

(65) Prior Publication Data

US 2011/0047182 A1 Feb. 24, 2011

(51) Int. Cl.
*G06F 17/00* (2006.01)
(52) U.S. Cl. ........ 707/919; 707/918; 707/920; 707/728; 707/792
(58) Field of Classification Search .................. 707/728, 707/792, 918, 919, 920
See application file for complete search history.

(56) References Cited

U.S. PATENT DOCUMENTS

| | | | |
|---|---|---|---|
| 6,032,004 A | 2/2000 | Mirabella, Jr. et al. | |
| 6,343,317 B1 | 1/2002 | Glorikian | |
| 6,526,351 B2 | 2/2003 | Whitham | |
| 6,535,745 B1 * | 3/2003 | Seraj | 455/458 |
| 6,622,020 B1 * | 9/2003 | Seki | 455/456.2 |
| 6,926,203 B1 * | 8/2005 | Sehr | 235/492 |
| 7,548,915 B2 * | 6/2009 | Ramer et al. | 705/14.54 |
| 7,911,335 B1 * | 3/2011 | Brady, Jr. | 340/539.11 |
| 2003/0055983 A1 * | 3/2003 | Callegari | 709/227 |
| 2008/0102856 A1 | 5/2008 | Fortescue et al. | |
| 2009/0054078 A1 * | 2/2009 | Golds | 455/456.1 |
| 2009/0104934 A1 | 4/2009 | Jeong et al. | |
| 2009/0136226 A1 | 5/2009 | Wu et al. | |
| 2011/0263219 A1 * | 10/2011 | Hasenfang et al. | 455/404.2 |

FOREIGN PATENT DOCUMENTS

| | | |
|---|---|---|
| GB | 2454954 | 5/2009 |
| WO | WO2008105766 A1 | 9/2008 |

OTHER PUBLICATIONS http://techcrunchit.com/2009/02/23, Social Web Q&A With Google's Kevin Marks, pp. 1-3, Aug. 24, 2009.
Office Action Communication Dated Feb. 8, 2012, U.S. Appl. No. 12/638,357, pp. 1-5.
Office Action Communication Dated Mar. 9, 2012, U.S. Appl. No. 12/638,357, pp. 1-6.
U.S. Appl. No. 12/638,357, XEROX, Notice of Allowance Communication, Jun. 26, 2012, 15 pages.

* cited by examiner

*Primary Examiner* — Sana Al Hashemi
(74) *Attorney, Agent, or Firm* — Gibb & Riley, LLC (57) ABSTRACT

Systems and methods maintain at least one point of interest data file within a computer-readable storage medium and automatically identify a current user location of a user based on a geographic positioning feature of a portable electronic device that is maintained within a first predetermined distance from the user. The systems and methods automatically compare the current user location with the point of interest data file to identify whether the user is located within a second predetermined distance of a point of interest maintained within the point of interest data file. If the user is within the second predetermined distance of a point of interest, the systems and methods automatically create a user status data file. The user status data comprises data identifying that the user is currently at the point of interest. The user status data file is comprised of, but is not limited to, video, still pictures, and audio captured at the current user location as well as textual description of the user's participation at the point of interest. The systems and methods automatically upload the user status data file to a social networking web site associated with the user as an activity post associated with the user.

20 Claims, 9 Drawing Sheets

AUTOMATIC UPDATE OF ONLINE SOCIAL NETWORKING SITES

BACKGROUND AND SUMMARY

Embodiments herein generally relate to social networking sites and more particularly relate to computerized systems and methods that automate activity postings to social networking web sites simply through the ordinary use of media and status capturing devices, such as GPS-enabled or other location tracking mobile devices, including phones, cameras, etc.

Conventionally, for one to upload picture-based activity postings to social networking web sites, the user (social networker) is required to take or record picture, audio, and/or video; save such items to a file; and then perform additional steps to upload such items to their social network pages, chat rooms, etc. During such a process, the user can also add textual remarks or tags describing such uploaded items.

Many conventional portable electronic devices (cell phones, personal digital assistants (PDA's), cameras, etc.) have geographic positioning features, such as global positioning system (GPS) receivers and other systems. These can record the time, date, and location (geographic position) of the user simultaneously while recording the audio, video, or pictures. Such time, date, and location information can be recorded as meta-data with the stored audio, video, or pictures.

However, it is often cumbersome and time consuming to the social networker to coalesce electronic output such as audio, video, or picture files, then to edit or annotate the content, and then upload the content to social networking web sites. Therefore, many people do not interrupt their current activities to constantly update their social networking web sites with every current activity as they visit points of interest. Also, many people only periodically update their social networking sites at certain times (such as in the evening, after recording many such pictures, video, etc., previously during the day).

The embodiments herein address such obstacles to keeping social networking sites constantly updated by providing automated computerized systems and methods that automate activity postings to social networking web sites simply through the ordinary use of media and status capturing devices, such as GPS enabled cell phones, cameras, microphones, etc. With the embodiments herein, the user (social networker) merely needs to be identified by a portable device in their possession and their social networking sites will automatically be updated with media content and textual descriptions of the user's location and activities, without requiring any input from the user. Further, if the point of interest employee or user takes or records audio, video, pictures, etc., such items will also be uploaded and automated text will be appended to such items, without any additional input from the user.

More specifically, one such embodiment herein utilizes a computer-readable storage medium that maintains at least one "point of interest" data file. A portable electronic device that has a geographic positioning feature, is in communication with a computerized processor and automatically identifies the location of the user.

The computerized processor (which is in communication with the computer-readable storage medium) automatically compares the current user location with the point of interest data file to identify whether the user is located close to (e.g., within a second predetermined distance of) a point of interest maintained within the point of interest data file. If the user is close to such a point of interest, the computerized processor automatically creates a user status data file. The user status data file comprises data identifying that the user is currently at the point of interest. The computerized processor then automatically uploads the user status data file to a social networking web site associated with the user as an activity post associated with the user.

The computer-readable storage medium can also maintain at least one textual data file comprising predetermined textual descriptions of the points of interest maintained within the point of interest data file. The computerized processor can optionally automatically merge the predetermined textual descriptions of the points of interest with the name (or some other identification) of the user to produce a unique string of text describing the user at the point of interest. The computerized processor can automatically add this unique string of text to the user status data file.

The portable electronic device (camera, cell phone, etc.) can capture video, still pictures, and/or audio simultaneously while identifying the current user's location if the user activates the appropriate capture buttons on the device. The computerized processor can also automatically add the video, still pictures, audio, etc., to the user status data file. Therefore, by simply carrying the portable device, or by taking pictures, audio, or video with the portable device, the user's social networking page(s) can be automatically updated, without requiring any additional input from the user. This reduces the cumbersome nature of conventional systems and allows users to more frequently update their social networking sites and to update their social networking sites in real time, without any additional effort.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, conventional systems require users to manually edit and annotate items and manually upload such items to social networking sites. For example, Web 2.0 applications such as microblogging, online/asynchronous discussions, and the sharing of photos, video clips, and music clips are largely manual processes for online social networkers. Due to their time consuming nature, such applications do not see their full potential as promotional tools for one's self, a business, an event, a community activity or service, a musical group, etc.

Therefore, the embodiments herein provide a hardware and software platform that facilitates the development of social networking applications to promote entities such as businesses, events, community activities or services, charities, musical groups, etc. The embodiment herein automatically update a user's social networking site upon the user's "real world" interaction with a particular location or entity at a remote site through the use of identification and location tracking devices, GPS navigation systems, and location-aware mobile devices such as cameras, mobile phones, and PDAs.

The past few years have seen the meteoric rise of social networking websites. Some people have integrated these tools into their daily lifestyle, and others prefer not to take part on a routine basis, due to already hectic schedules. Web 2.0 applications, such as microblogging, online/asynchronous discussions, and the sharing of photos, video clips, and music clips are common manual processes for online social networkers. The vast majority of popular social networking sites offer open application programming interfaces (APIs) with which users can develop applications that enhance their online social networking experience. A sampling of these APIs is listed here:

MySpace API http://developer.myspace.com/community/RestfulAPIs/intro.aspx;

Facebook API http://wiki.developers.facebook.com/index.php/API;

FriendFeed API http://friendfeed.com/api/;

Jaiku API http://api.jaiku.com/;

Twitter API http://apiwiki.twitter.com/FAQ;

Loopt API (for location-based social networking) http://www.techcrunch.com/2008/01/16/loopt-launches-mobile-social-networking-application-platform/; and OpenSocial API (open source interface to many of the above sites) http://code.google.com/apis/opensocial/.

The most common types of applications written for social networking sites include:

Sharing of virtual gifts or trinkets;

Sharing information discovered on other web sites

Promotion of a cause or for a business;

Information gathering (personality quizzes, music sharing, etc.); and

Online Games.

In these applications, there is generally an expectation of significant interaction with the user, often with the desirable result of the user to purchase credits in order to continue using the application. Another benefit of social networking sites is promotion—of one's self, a business, an event, a community activity or service, musical groups, etc. Users can become fans of other entities, thereby being able to receive news and join in the online discussions for a particular entity.

The embodiments herein address the time-consuming manual aspects of social networking applications by providing automated systems and methods to automate content updates on social networking websites. Specifically, the embodiments herein provide a socially-enabled experience capture platform (sometimes referred to as an experience capture platform) by which promotional entities can automatically update a user's social networking site upon the user's "real world" interaction with the particular entity.

The approach taken makes use of existing technology that is already being used to capture a patron's experience at a particular venue or event. Through the use of GPS for location discovery, cameras for photo and video capture, microphones for audio capture, and other types of devices, a variety of information can be gathered to document the patron's experience. The systems described herein provide such a venue or event with an experience capture platform that easily creates a social networking application that connects the capture of the experience to the desired social networking site(s). Not only is the experience shared with the patron's friends in near real-time, the friends of the patron are able to view and comment on the experience. Given a mobile web-enabled device at the venue or event, the patron can interact with his friends while participating in the event.

Figure 1:
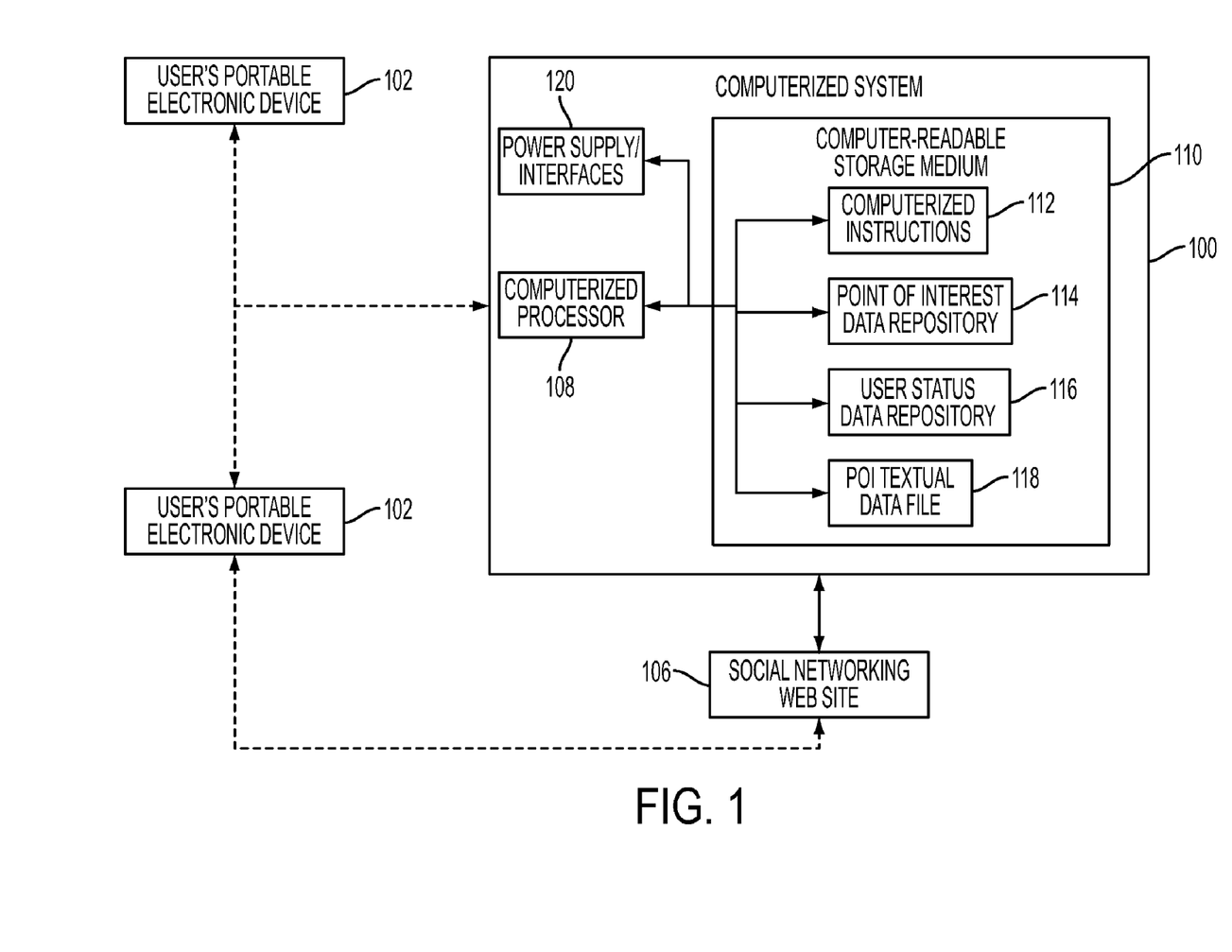
FIG. 1 is a schematic diagram of an exemplary system according to embodiments herein.

FIG. 1 illustrates one exemplary system embodiment. The system presented in FIG. 1 utilizes a computer-readable storage medium 110 that maintains at least one "point of interest" (POI) data file 114. One or more portable electronic devices 102 (camera enabled cell phones, PDA's, etc.) that have a geographic positioning feature (e.g., GPS receiver, cell tower triangulation processor, etc.) are in communication with a computerized processor. (For details of such portable devices, see U.S. Patent Publication Number 2009/0136226 the complete disclosure of which is incorporated herein by reference.) Such a processor can be located within the portable electronic devices 102 or can be the computerized processor 108 shown within a separate computerized system 100. The computerized processor 108 automatically identifies a current user location of a user when the portable electronic device 102 is carried or possessed by the user or an employee of a vendor escorting the user (that is maintained within a "first" predetermined distance from the user). The portable electronic devices 102 are in wired or wireless communication with the computerized system 100 through a local area network or wide area network (such as cell phone networks and the Internet) as indicated by the dashed lines.

The computerized system 100 can be one or more devices that are physically or logically connected to one another (such as in a cloud environment). While illustrated separately, many of the elements of the computerized system 100 can be included within the portable electronic devices 102 which identify the user and provides media and status for its associated point of interest. Such elements or devices include a computer-readable storage medium 110 that can comprise one or more physical devices, such as electronic storage, magnetic media storage, optical storage, etc. and various necessary elements, such as power supply, physical connections interfaces, etc., 120. The computer readable-storage medium 110 can store (tangibly embody) many files such as computerized instructions or computer programs 112, associated data, etc. Such instructions or programs 112 are executed by processors, such as the computerized processor 108, to perform the various methodologies and functions described herein.

The computerized processor 108 (which is directly or indirectly in communication with the computer-readable storage medium 110) automatically compares the current user location with a point of interest data file 114 to identify whether the user is located at or close to (e.g., within a "second" predetermined distance of) a point of interest maintained within the point of interest data file 114. If the user is close to such a point of interest, the computerized processor 108 automatically creates a file entry in the user status data file 116. The user status data file 116 comprises data identifying that the user is currently at the point of interest. The computerized processor 108 then automatically uploads the user status data file 116 to a social networking web site 106 associated with the user as an activity post associated with the user.

The computer-readable storage medium 110 can optionally maintain at least one textual data file 118 comprising predetermined textual descriptions of the points of interest maintained within the point of interest data file 114. Upon registration by a vendor with the computerized system 100, the vendor's point of interest's specific information is stored in the point of interest data file 114 and textual data file 118. While a textual description of the user's current location is provided as an example of an item that can be included within the user status data file 116, such textural descriptions are not required. For example, graphical items such as map location identifiers of the points of interest, previously stored pictures of the points of interest, previously stored logos of the points of interest etc., can be added to the user status data file 116 instead of or in addition to any predetermined textual descriptions of the points of interest.

The computerized processor 108 can automatically merge the predetermined textual descriptions of the points of interest with the name (or some other identification) of the user to automatically produce a unique string of text describing the user at the point of interest. The computerized processor 108 automatically can add this unique string of text to the user status data file 116. Therefore, with embodiments herein, the user need merely turn on and carry such a GPS-enabled portable device in order to have textual descriptions of their current location created and uploaded to their preferred social networking sites, and the user does not need to take any other action to maintain their virtual presence with their friends.

The portable electronic device 102 (position-aware camera, cell phone, etc.) can capture video, still pictures, and/or audio simultaneously while identifying the current user's location if the user activates the appropriate buttons on the device. The computerized processor 108 can also automatically add the video, still pictures, audio, etc., to the user status data file 116. Therefore, by simply carrying the portable device, or by taking pictures, audio, or video with the portable device, the user's social networking page(s) 106 can be automatically updated, without requiring any additional input from the user. This reduces the cumbersome nature of conventional systems and allows users to more frequently update their social networking sites and to update their social networking sites in real time, without any additional effort.

A collection of point of interest data files 114 and user status data files 116 and textual data file associated with the point of interest 118 can be represented in a data repository or content management system. Such a repository can provide a Space Template 700 for use among a plurality of points of interest and users (see FIG. 7, discussed below).

Figure 2:
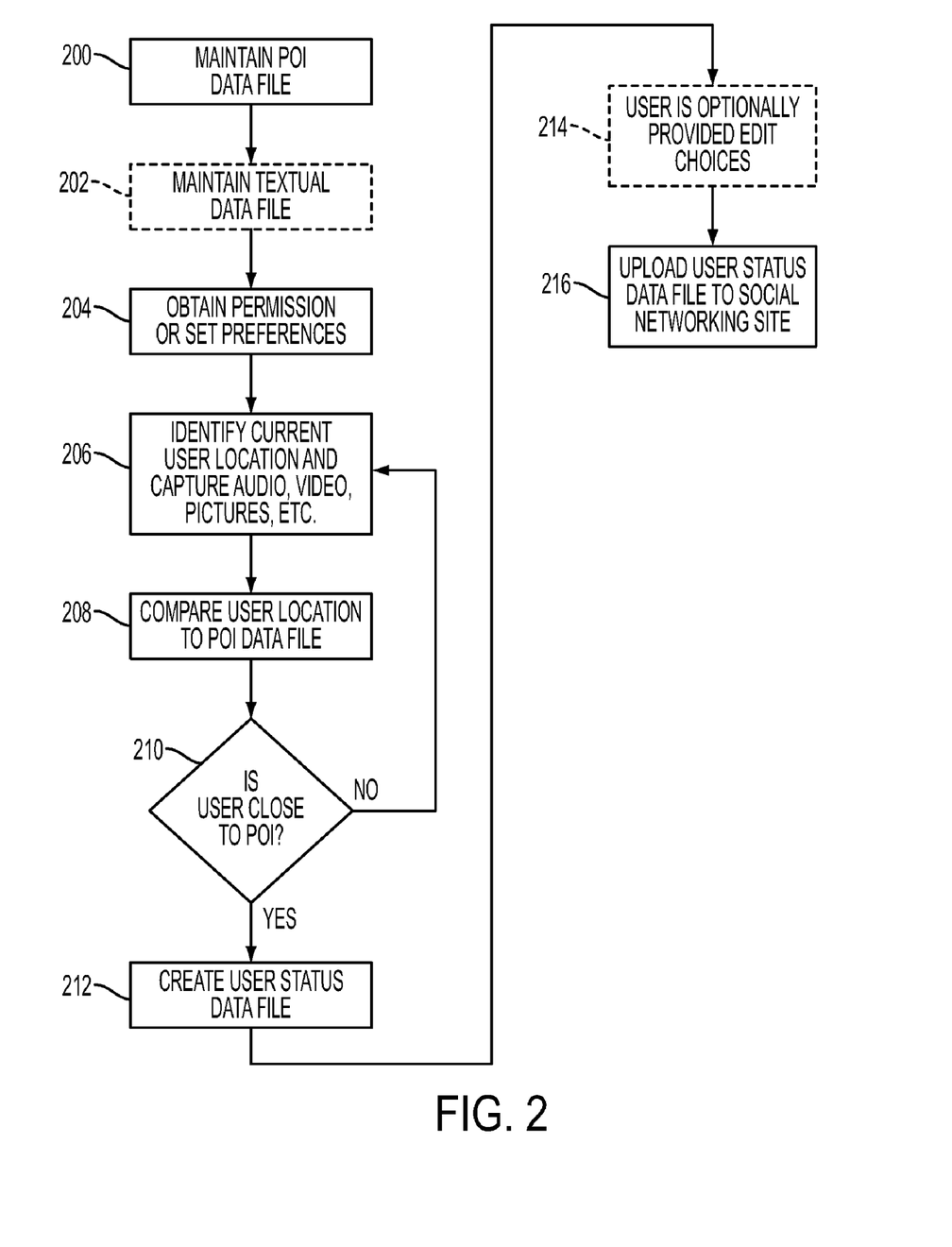
FIG. 2 is a flowchart illustrating embodiments herein.

FIG. 2 is a flowchart illustrating various method embodiments herein. More specifically, in item 200 of FIG. 2, using a vendor-offered service as an example, one computer-implemented method herein maintains at least one point of interest data file comprising points of interest (potentially associated with a vendor) within a computer-readable storage medium. As part of the process of maintaining the POI data file, in item 200, the embodiments herein allow vendors and other parties to register various points of interest, thereby allowing the POI data file to be continuously updated. In addition, as shown in item 202, embodiments herein can optionally maintain (also within the computer-readable storage medium) at least one textual data file that comprises predetermined textual descriptions of the points of interest maintained within the point of interest data file. Textual descriptions of the points of interest may be also updated continuously by vendors and other parties.

A vendor can obtain permission from the customer/user to update their social networking web sites in item 204. The user can also (or alternatively) set their preferences in item 204 as described in greater detail below.

In item 206, the method automatically identifies the user's current location based on a geographic positioning feature of a portable electronic device (e.g., camera, PDA, cell phone, etc.) that is carried by the user's guide (vendor's employee) or is carried by the user/customer (e.g., that is maintained within a first predetermined distance from the user). Also, simultaneously while identifying the current user location in item 206, the method can optionally capture video, still pictures, and/or audio, etc.

In item 208, the method automatically compares the current user location with the point of interest data file to identify whether the user is located close to (within a second predetermined distance of) a point of interest (potentially associated with the vendor) maintained within the point of interest data file. As shown above, the processes herein perform such automated tasks using a computerized processor that is in communication with the computer-readable storage medium and that is in communication with the portable electronic device.

In item 210, the method determines whether the user is close to (e.g., within the second predetermined distance of) a point of interest. If the user is not close enough to a point of interest, the process loops back to item 206 to continue to identify the current location of the user.

However, as shown in item 212, if the user is close enough to (within the second predetermined distance of) a point of interest, the method automatically creates a user status data file using the computerized processor. In this example, the point of interest would be associated with a specific vendor; however, different point of interest data files can be established for different vendors, or for different interest groups. Thus, for example, different point of interest data files could be maintained for a specific geographic area (continent, country, city, etc.) or different interest groups (sports, museums, theaters, etc.) or for different items (colleges, etc.). When utilizing the embodiments herein, a user has the option to have their current location associated with one or more of such point of interest data files. The user status data file created in item 212 stores geographic data identifying that the user is currently at the point of interest associated with the vendor and can automatically add the textual description of the geographic location to the user status data file.

For example, with respect to the optional textual description added to the user status data file in item 212, the embodiments herein can automatically merge the predetermined textual descriptions of the points of interest with an identification of the user (user name, user screen name, etc.) using the processor to produce a unique string of text describing the user at the point of interest. For example, if the user's name was Tom and the point of interest Tom was visiting was the Eifel Tower, this user identification can be added to the previously prepared textual description "<UserID> is at the Eifel Tower in Paris" to create a unique string of text: "Tom is at the Eifel Tower in Paris." This unique string of text is automatically added to the user status data file. This process of creating the user status data file 212 can also automatically add the video, still pictures, and/or audio, etc., captured in item 206 to the user status data file to potentially show Tom at the Eifel Tower.

In item 214, the used can optionally be provided some editing choices on the portable device. For example, in item 214, the user can be allowed to add or remove text, pictures, audio, video, etc., from the previously automatically prepared user status data file. Thus, once a user status data file has been created, the user can be provided some form of notice that the automatically prepared user status data file is ready to be uploaded and the user can optionally be provided a yes/no choice of whether to edit the file. If the user declines to edit the file or finishes editing the file, it will then be automatically uploaded.

More specifically, after creating and editing the user status data file in items 212 and 214, the embodiments herein then automatically upload the user status data file to a social networking web site associated with the user (as an activity post associated with the user) using the computerized processor in item 216. Note that, item 214 is purely optional and if the user does not provide any editing input, the status data file is still complete and ready to be uploaded as an activity post about the user.

Therefore, embodiments herein automatically prepare and upload activity posts about the user to the social networking site, without the user having to take any action (other than carry their portable device in the on position. If the user (or the vendor) takes pictures, records video, etc. those items will also be added to the user status data file automatically, without any action other than simply taking the pictures, recording the video, audio, etc.

With embodiments herein there is no need to take any action to create or edit the user status data file and no need to take any action to upload the user status data file as the entire process is automated (although the user can review or edit any activity posts before they are actually uploaded). Since the embodiments automate all steps required to create and upload an activity post to a social networking site, the user's satisfaction with the point of interest and the social networking site increase dramatically because they can satisfy their need to be constantly connected to their online community, without having to take time away from their reality-based activity.

As mentioned above, the user can set their preferences in item 204, which provides safeguards to the user to maintain user privacy. Therefore, in item 204, the user can identify (through various menu driven options on the portable device) when and how often automated activity posts will be generated about them. For example, the creation of user status data files can be limited to certain days (dates when the user is on vacation), certain times of the day, certain geographical locations, certain frequencies (once an hour, etc.), etc. The user can also toggle on or off the features described herein to only allow user status data files to be created when the user explicitly allows them. In addition, in item 204 the user can edit generically created point of interest files or textual data files (items 200 and 202) to more closely match their personal style. Further, the user can limit which social networking sites will receive the posts of the user status data files in item 204. While some preferences are mentioned herein, as would be understood by those ordinarily skilled in the art, these preferences are merely examples and many other preferences can be selected in item 204.

Although the capabilities of social networking sites are continually growing, types of automatic updates that are capable with the embodiments herein include the following. The embodiments herein can automatically create a new photo album and upload pictures to the album documenting the user's experience. Via similar technologies that enable the Facebook Mobile photo uploader application, Facebook API calls are used such as photos.createAlbum, photos.upload, and photos.addTag, to update the patron's site with pictures captured at the event. Similarly, audio clips and video clips can also be captured and shared.

Additionally, uploaded pictures to social networking and photo sharing sites are notorious for incorrect and confusing tagging. Often, people will upload a set of pictures and tag the entire set as one which leads to pictures that don't contain the elements which the tag denotes. Such an automated system of embodiments herein can more accurately tag the shared pictures.

The embodiments herein can perform status updates in various intervals and granularity; for instance, from posting generic status such as "Michael is touring the Metropolitan Museum of Art in New York City", to posting more specific status updates such as "Michael is touring the Buddhist Paintings exhibit at the MET". Also, when particular events or actions occur during the visit, a status update can be made such as "Michael just became a member of the Metropolitan Museum of Art". Numerous third-party applications can be utilized to further the interactive experience. For instance, a Facebook third-party application "Cities I've Visited" can be updated to automatically place a pin on the city of the venue or event.

As all these different types of updates are made by embodiments herein to the desired social networking portal in real time, the patron's friends can add comments, also in real time, to the patron's social networking site. Then, via any mobile web-enabled device (at the point of interest, the patron may receive feedback and suggestions for enhancing their particular experience. For instance, in response to the automatic status update of "Michael is touring the Buddhist Paintings exhibit at the MET", one of Michael's friends can post "Hey, I was just there last week. Be sure to check out the Buddhist meditation garden."

Figure 3:
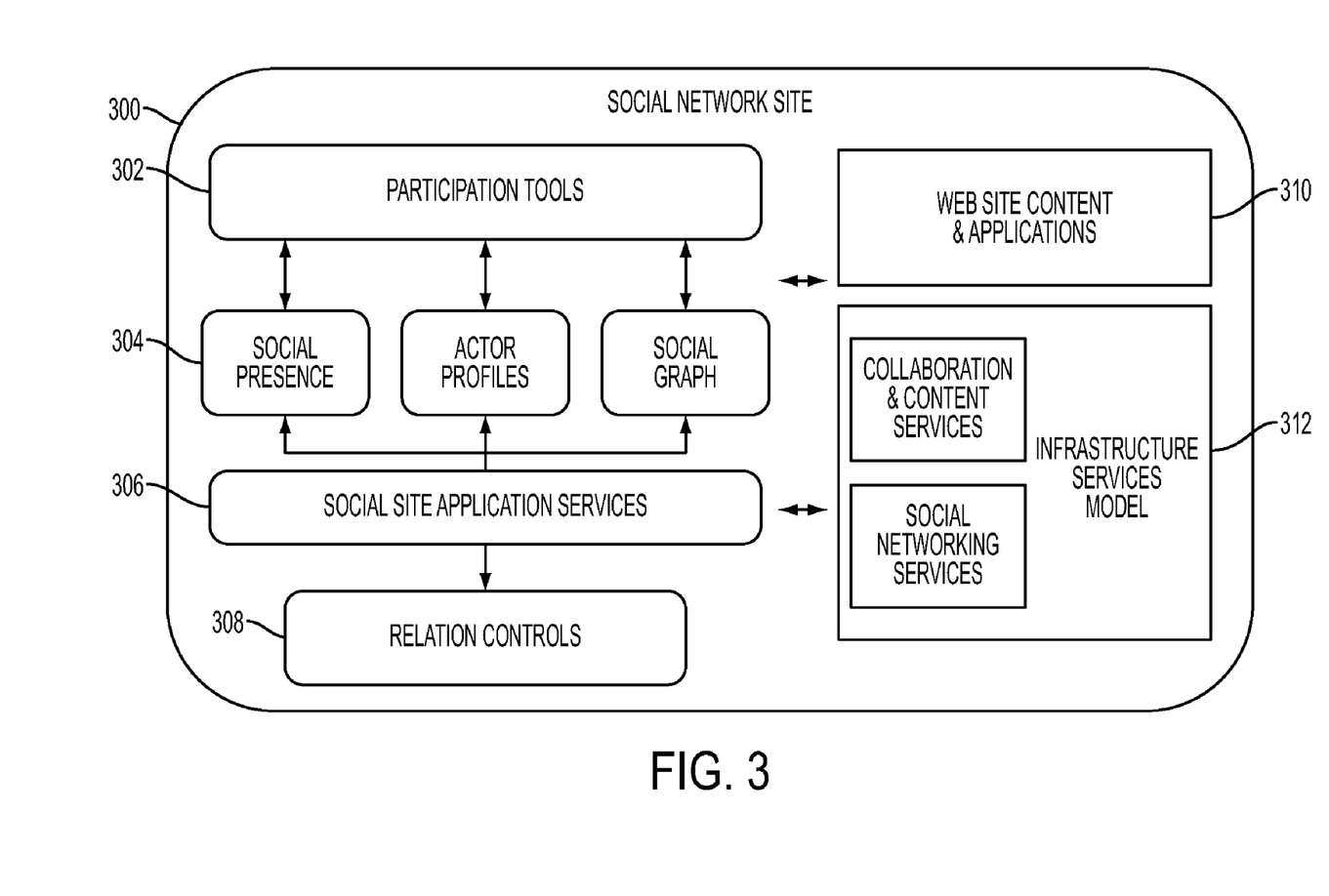
FIG. 3 is a schematic diagram of an exemplary system according to embodiments herein.

FIG. 3 depicts a social networking site 300 that supports new applications. It includes, for example, participation tools 302; societal items 304 such as social presence, actor profiles, and social graph; social site application services 306; and relation controls 308. The web site content and application are shown as item 310 and the infrastructure services model is shown as item 312 and is shown to include collaboration and content services as well as social networking services. The computerized system 100 interacts with social networking site 300 through the site's advertized infrastructure services 312.

In order to use the point of interest's application built on such an experience capture platform, the patron must first allow the application access to their social networking site (item 204, above). Before attending the point of interest, the patron can use a remote computer, mobile device, or local computer to allow the application to access and modify their activity content as well as allow offline access so that it may update content while the patron is not actively on the social networking site.

Figure 4:
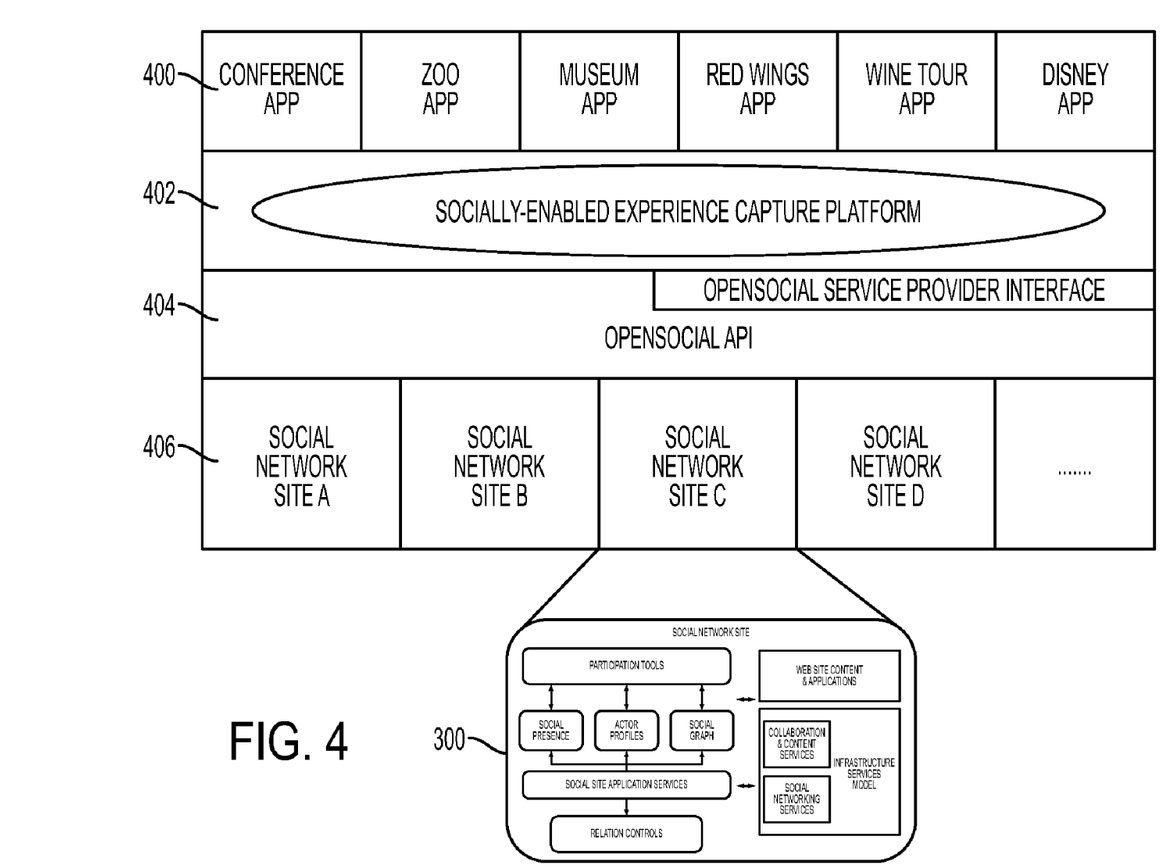
FIG. 4 is a schematic diagram of an exemplary system according to embodiments herein.

The platforms of embodiments herein enable a variety of social networking applications 400 to be easily built and deployed, as shown in FIG. 4. These include, but are not limited to, a conference application, a zoo application, a museum visit application, a baseball game visit application, a wine tour application, a theme park visit application, etc. The experience capture platform 402 provides the capabilities of the computerized system 100 described herein and provides a high-level interfacing layer (as shown expanded in FIG. 5). The experience capture platform is built on top of social networking application programming interface (API) 404, which may include, but is not limited to, the OpenSocial API. The social networking API 404 is in communication with many of the social networking services 406 such as the one 300 depicted in FIG. 3 (e.g. Facebook, LinkedIn, MySpace, etc.).

Figure 5:
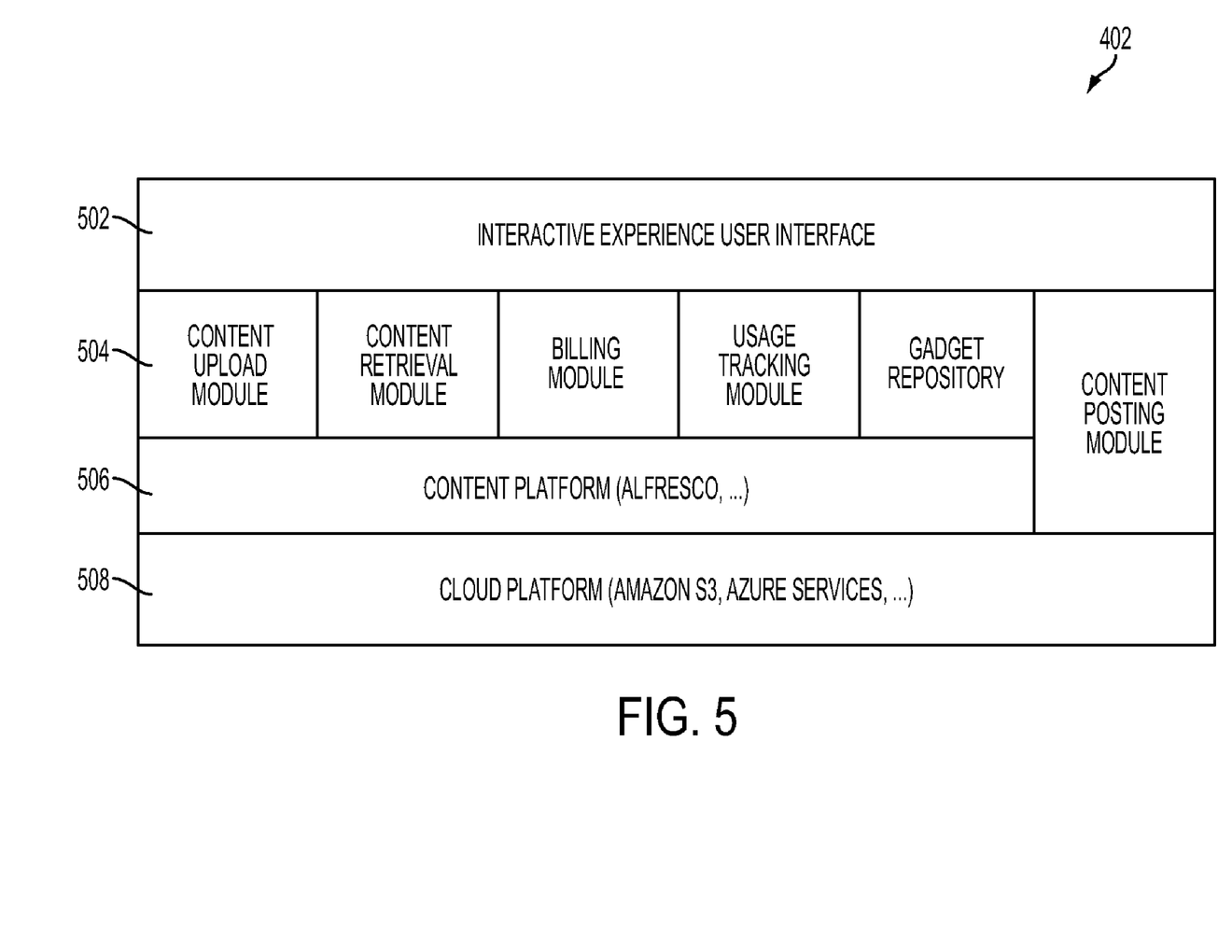
FIG. 5 is a schematic diagram of an exemplary system according to embodiments herein.

FIG. 5 illustrates the socially-enabled experience capture platform 402 shown in FIG. 4 in greater detail. The socially-enabled experience capture platform 402 includes an interactive experience user interface 502 that allows the user to provide input, such as those described above. Various modules 504 are provided including a content upload module (used to upload and maintain files such as the point of interest file 200 and the textual data file 202); content retrieval module (used to retrieve data from files such as, but not limited to, the point of interest file 200 and the textual data file 202); billing module (used by a vendor to bill the user for services provided by the embodiments herein, potentially on a pay-per-use basis); usage tracking module (used to determine the amount a user is billed and to determine usage statistics); a gadget repository (the gadgets are discussed below); and a content posting module (used to upload the user status data file 216). The content platform 506 can be any intermediate software used to support such modules.

The socially-enabled experience capture platform is presented in the form of, but not limited to, a Platform as a Service (PaaS) or Cloudware 508 with no need for software downloads, installation, or IT managers. By leveraging existing computing infrastructure and content management system technologies, the point of interest registration, management, and interoperability with user activity is persisted using known methods and systems.

Figure 6:
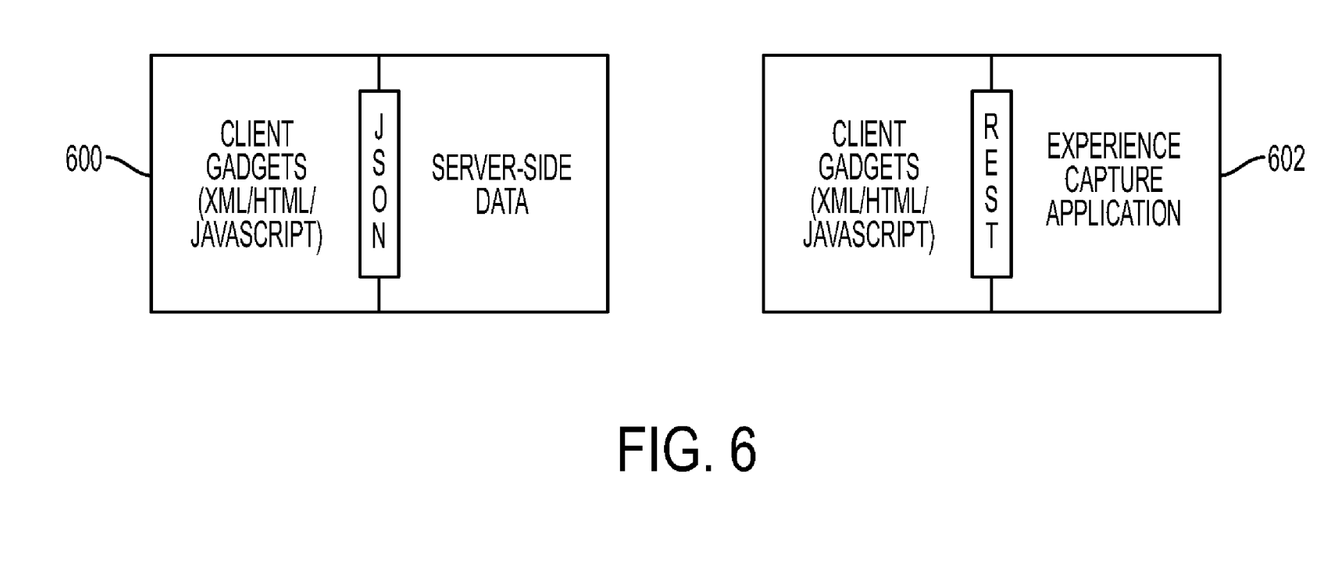
FIG. 6 is a schematic diagram of an exemplary gadgets according to embodiments herein.

The infrastructure for gadget and server interoperability is provided by the experience capture platform. The platform offers prebuilt gadgets which simply require configuring in order to gather desired data. Two such gadgets are illustrated in FIG. 6 one with server side data 600 and the other with an experience capture application according to embodiments herein 602.

Client-side gadgets in 600 and 602 serve as lightweight mechanisms to present an application's view in a modular way. Gadgets typically appear embedded in a web page or on a desktop. For example, JSON (JavaScript Object Notation) available from Sun Microsystems, Santa Clara Calif., USA is a lightweight data-interchange format for client applications that pulls dynamic data from a server with little or no need for behavioral control from the server. A REST (REpresentational State Transfer) interface provides for a more robust server-side application (HTTP used for data and session tracking, SOAP used for messaging) in which a social networking server-side application, such as OpenSocial, can perform more process intensive tasks to drive the gadget.

Some features of this platform include that it has easy-to-configure client gadgets for data feeds including audio/video stream, metadata, audio/video clips, etc. Further, embodiments herein provide easy-to-configure repository access in which to upload experience content for publishing to social networking sites. The embodiments herein incorporate multiple social-networking sites to share experience content simultaneously. Embodiments herein have the ability to draw from other web-based services to enhance experience content published to social networking sites, can use a pay-per-use billing model, can collect usage data to determine the value of services provided, and have near-infinite scalability.

Figure 7:
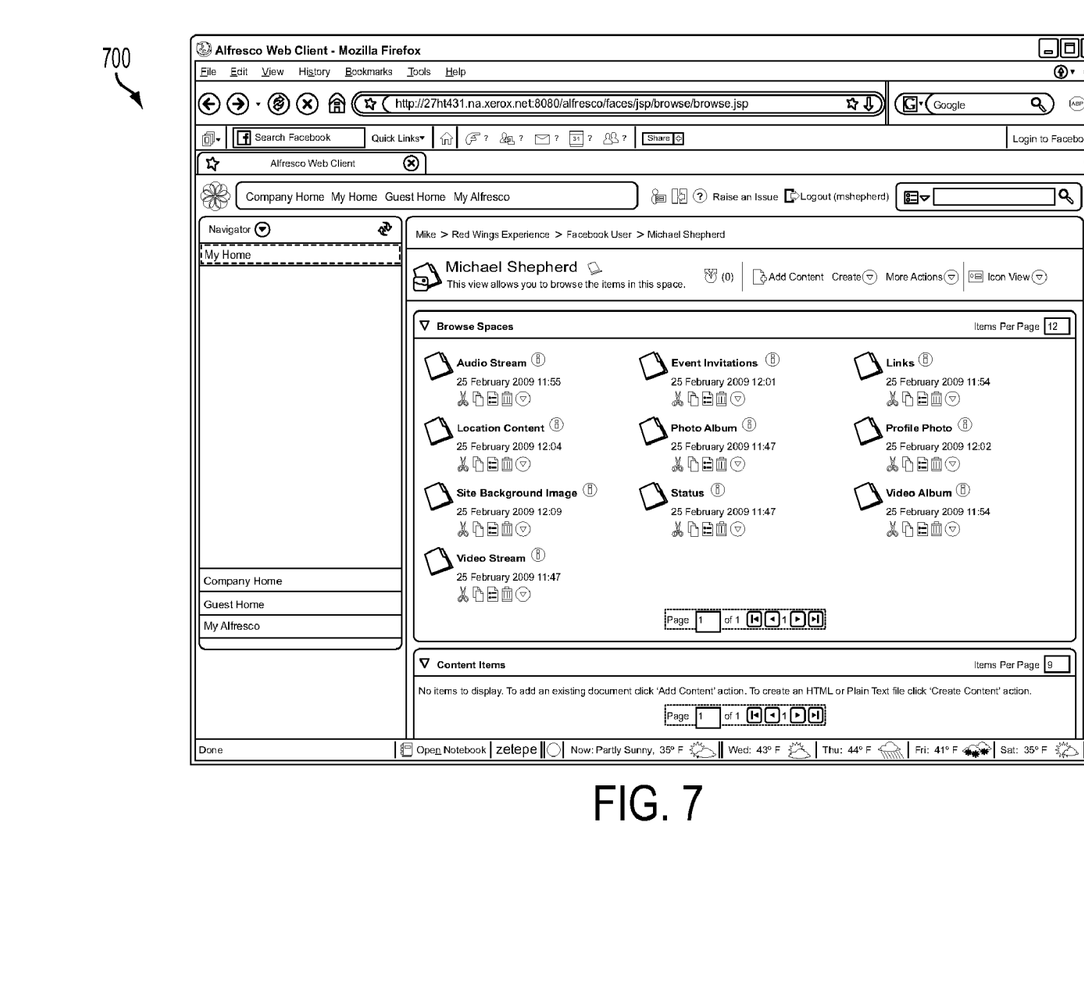
FIG. 7 is a schematic diagram of an exemplary graphic user interface screen shot according to embodiments herein.

Experience content can be uploaded to a content platform, such as Alfresco (available from Alfresco Software, Inc., San Mateo Calif., USA), via a content upload module or through manual or automated file copy mechanisms to appropriate folders. For example, FIG. 7 illustrates a screenshot of such items and folders. Once content is available on the content platform, it can be transmitted to other platform modules for processing, or, via a content platform's workflow capability, the content can kick-off predefined workflows for posting and tracking the experience content.

A Space Template (in Alfresco's case) can be preconfigured in the experience capture platform that contains spaces or folders that provide the connection in which to store content from the experience. As content can be pushed into these spaces, actions are invoked that put the activity content on the user's social networking site.

For instance, as seen in FIG. 7, an application can be built that captures the experience at a Red Wings baseball game. Sub-spaces exist for the various connection types such as Facebook API, OpenSocial API, etc. Upon registration with point of interest or venue, the patron of the event is automatically set up with their own space conforming to a Space Template 700 of that social networking site. FIG. 7 is an example of such a Space Template. In the case shown above, Facebook user Michael Shepherd and application Red Wings Experience allow numerous types of content to automatically update his Facebook site, including status, event invitations, links to related websites, photos, videos, etc.

Figure 8:
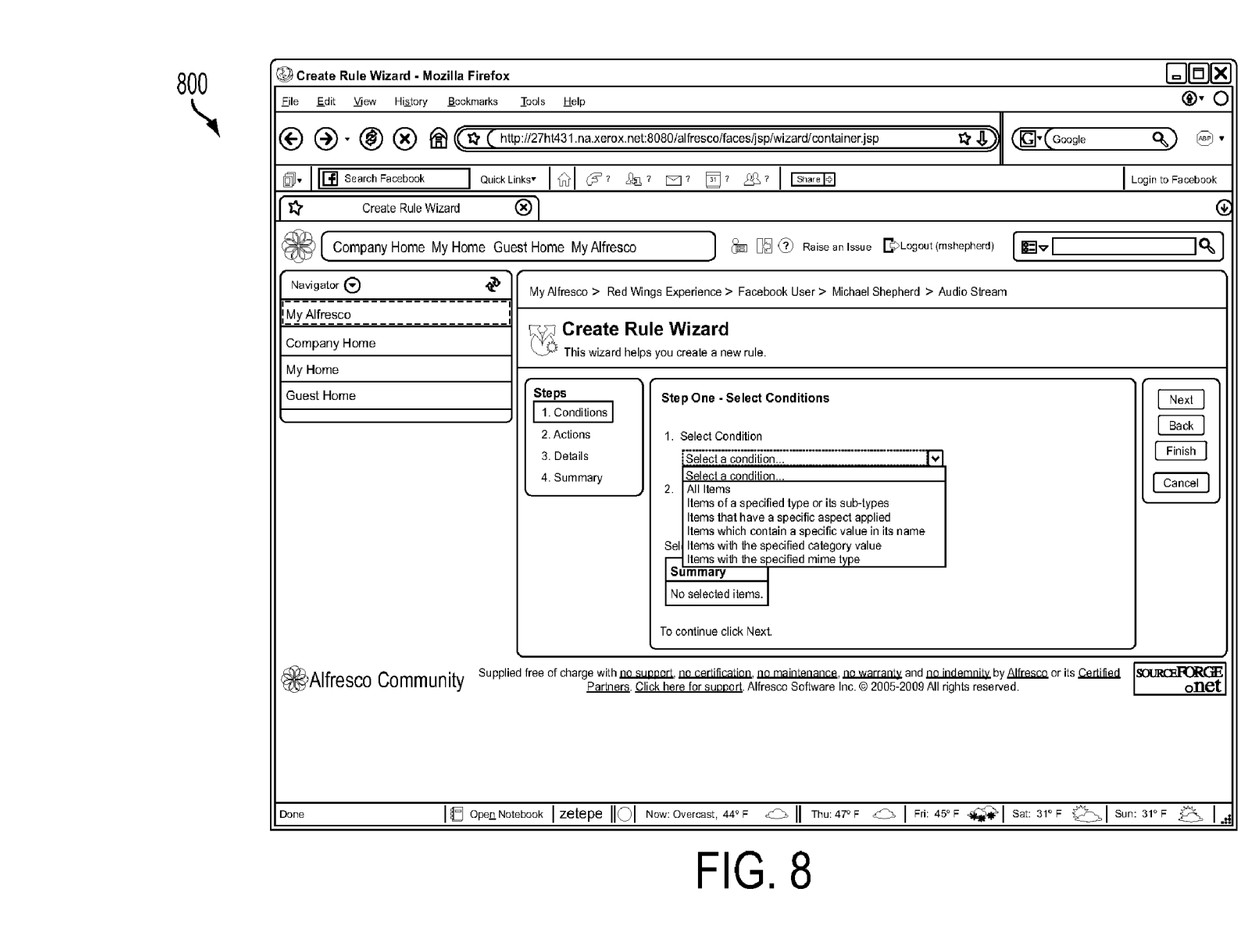
FIG. 8 is a schematic diagram of an exemplary graphic user interface screen shot according to embodiments herein.
Figure 9:
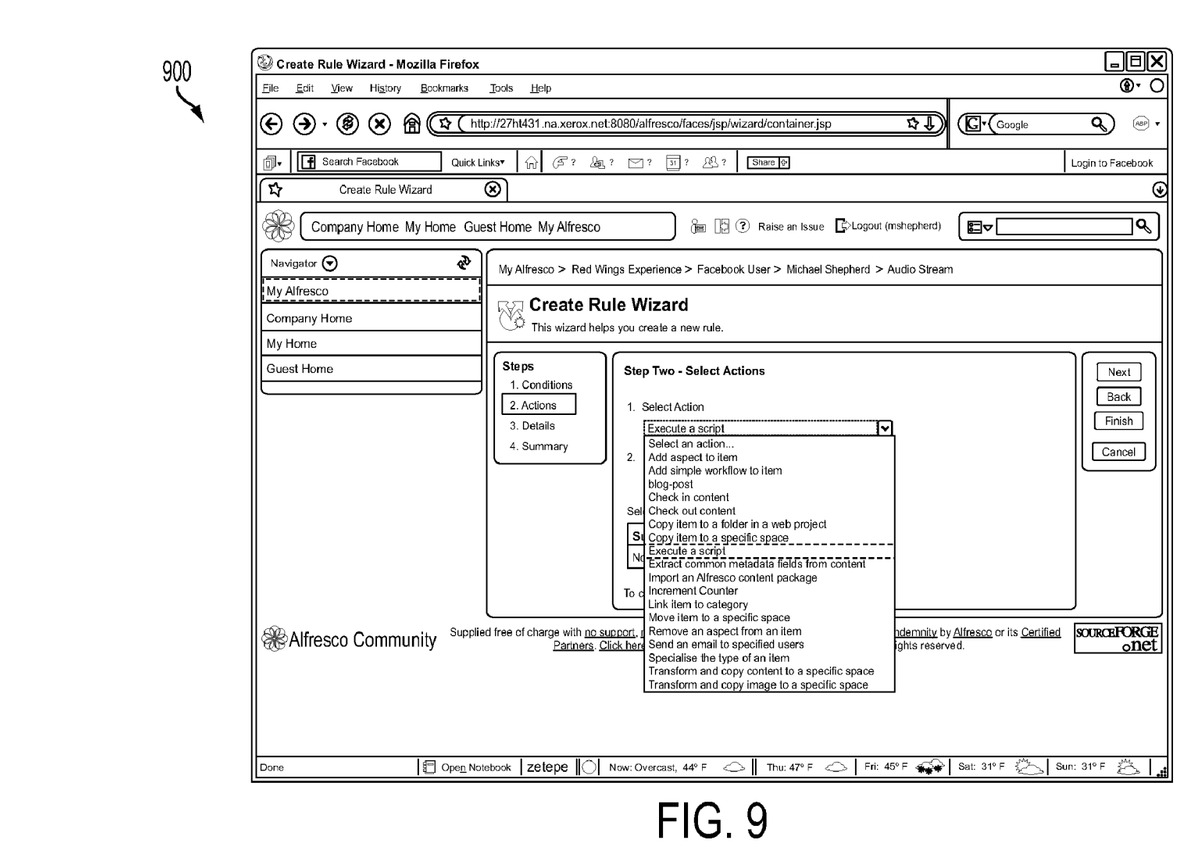
FIG. 9 is a schematic diagram of an exemplary graphic user interface screen shot according to embodiments herein.

As part of the preconfigured Space Template 700, workflow rules are also preconfigured for the different sub-spaces for acting on the content placed into the sub-space. As mentioned above, in item 204 user preferences can be supplied through a user interface to determine how and when the embodiments herein operate. FIG. 8 illustrates such an interface 800 and FIG. 9 illustrates another example interface as item 900. Those ordinarily skilled in the art would understand that there could be many different forms of interfaces and that the drawings herein illustrate two non-limiting examples.

Different rules may even be applied within the sub-space by using conditions that will only invoke the rule if the content put into the sub-space meets certain criteria. An action can be then assigned to the experience content that can be placed into the sub-space with the conforming conditions. Numerous actions may be taken on the content, including notification, logging, tracking of usage, invoking external web services, archiving, transformation, etc., but the main action in relation to the experience capture platform can be to invoke a server-side module which provides the experience content to the online social networking site via an interface such as REST (a common HTTP interface supported by social networking sites).

For example, a server-side module for the Video Album sub-space can upload a video clip to YouTube, and then embed a Flash or Silverlight component in the patron's MySpace page that linked to the clip. A server-side module for Event Invitations can post an event on Facebook and invite the patron's friends to acknowledge attendance to the event—for example, future baseball games or special museum attractions which can then link those friends to an external website to acquire tickets to the event. A Location Content module can have the ability to update a location based social networking site such as http://www.loopt.com/

Some examples of potential social networking applications that can be built are described in the following scenarios. Scenario 1: Special Events (fund raiser, zoo, museum, sporting events . . . ). At a major league baseball game, a boy can be chosen to participate in a contest between innings (such as throwing a ball through a target or carrying precariously balanced items to a finish line). The baseball stadium offers to capture the boy's experience, using one of the mobile devices discussed above, and post it to one or more social networking sites. Before the game, the parents grant permission for the baseball stadium's Facebook application to update the parent's social networking pages, or alternatively, grant permission when at the stadium through an electronic device, connected to Facebook.

The stadium's Facebook application can then be used to post status, photos, video and audio to the parent's Facebook site. When the event starts, the embodiments herein posts a new status "Johnny has started playing the Red Wing's Grand Slam target throwing contest to win $1000." During the contest, the stadium personnel running the game take photos and capture video and audio, using one of the mobile devices discussed above. As photos are snapped, they are automatically posted into a "Red Wings Grand Slam" photo album on the parent's Facebook site. A Facebook video link would provide access to a streaming video of the contest as it is occurring. Friends of the site may choose to post comments on the status, pictures, or video on the Facebook site such as "Nice throw!"

For the duration of the event, an image of the stadium or Red Wings team may be temporarily set as the social networking site's background image. After completion of the event, the stadium application can post a new status "Johnny just won $1000 playing the Red Wings Grand Slam throwing contest" or "Johnny successfully threw 8 out of 10 in the Red Wings Grand Slam throwing contest". A video clip documenting the action of the contest can then also be posted to the parent's Facebook site. Other comments from friends can then be made such as "Way to go, Johnny!"

Scenario 2: Multiple-location Events (vacations, business trips, amusement parks, resorts . . . ). A group of friends may decide to go on a winery tour around Seneca Lake. The Seneca Lake Wine Trail Association may offer a Loopt application (location-aware social networking site) built upon the experience capture platform of embodiments herein. Some of the friends may elect to enable the wine trail application according to embodiments herein on Loopt. A GPS-enabled or cellular triangulation-enabled mobile device can be linked to Loopt so that it may acquire the position of the person. Optionally, the person may allow Loopt to update their status on Facebook, MySpace, etc.

Upon arrival at a winery, the wine trail application would initiate a location-based update to Loopt. "Michael is visiting Fox Run Winery near Penn Yan, N.Y." The winery personnel can capture multimedia content of the group using mobile devices as they tour the vineyards and taste wine. By providing an identification mechanism, such as through the mobile device, an RFID tag, unique string, or other means, the embodiments herein automatically connect to the user's social networking site and post the multimedia content to their profile.

During the group's visit, a remote social networking friend may post to the user's profile "You really should try Fox Run's Reserve Riesling while you are there." Upon visiting the next winery, the new status can be posted to the user's profile and the same identification mechanism is used to continue adding multimedia content to the profile as well. In one example, some theme parks already provide personalized promotions and photo services so that patrons can visit a personalized URL of their visit and buy personalized merchandise. The embodiments herein would enhance this experience by tying the existing capability of capturing a multimedia experience (as exemplified in the social networking APIs listed above) with automatically updating a social networking site with the content.

Scenario 3: Speaking Engagement (seminars, roundtables, keynotes, etc.). A seminar or trade show can be enabled with a social networking application built on the experience capture platform described herein. A presenter can grant permission to the embodiments herein to update his/her social networking site. When she begins her talk, the embodiments herein will automatically post a status update to the site with "Jane has started presenting on The Advantages of Online Social Networking." During the presentation, photos, video and/or audio clips, and streaming video and/or audio would be posted to the presenter's site as well.

During the course of the talk, remote colleagues of the presenter can comment in the online social networking portal in which to give feedback or ask questions of the presenter. Even after the talk is over, social collaborators can continue to contact the presenter for particular points to be elaborated upon or request additional research to be done. The embodiments herein can also update or tag the presenter's area of expertise or interest with the topic of the talk. Participation in roundtable and conferences can also be likewise noted. Conference attendees may also have abstracts of the presentations they attend be automatically posted to their social networking site, which along with other multimedia content captured at the conference, provide a feed to automatically document a trip report.

Scenario 4: Mobile Worker. A mobile worker may travel extensively for their job. An online social network of coworkers would be able to easily stay in touch on the mobile worker's whereabouts and issues they are having on the job. When arriving at a destination, a mobile worker can use a GPS or location-aware device, such as a mobile phone, to notify the social network of their new location. A mobile worker such as a printer service technician can invoke an administrative routine on a location-aware printer to update his status with his location. During a service call, the technician can post video or pictures of hard to diagnose problems or issues not encountered before.

Social Networking sites today generally favor two kinds of communication—one-to-one or broadcast. A user can be either messaging a single person, or they are posting to an open kind of "activity stream" in which all his friends can view and comment. The embodiments herein not only enable the ability to easily create applications with the capabilities described in the scenarios above, but also to communicate with dynamic groups of people. In the case of the wine tour scenario, the experience capture platform can provide for communication with:

All of my friends

All of my friends and their friends

A subset of my friends who have tagged "wine" as an interest in their profile

A common interest group such as "I love wine!"—a more public group of people

A subset of such an interest group

A fan page—I'm a public figure/celebrity and I'm going to share my wine experience with all my fans.

Additionally, previous friends or other users of the social network that have already visited the venue or event may wish to expose this fact to their friends or the public. Then when a patron visits the experience capturing point of interest, they may access the experience content from people who visited before them. A voting thumbs-up/thumbs-down mechanism may be used which conveys the recommended or not-recommended aspects of venue or event. Voting may also be captured by the point of interest's social networking embodiments herein to easily know which elements of the event are favorable and which are not.

With embodiments herein creation of a new application for a particular entity does not require any software development expertise. The experience capture platform described herein contains all pieces necessary for easy setup, configuration, and actuation of gadgetry. Content of a patron's experience may be added to the content management system both manually and automatically. From a manual perspective, venues who have set up their own application on this platform may map a client desktop system to the content management system for dragging and dropping desired content to appropriate locations. Alternatively, more sophisticated venues can develop software that automatically feed a patron's experience content to the content management system. Venues such as theme parks, which already have mechanisms for pushing user experience content to their own content management systems for building personal web pages and other artifacts for their patrons, can similarly push the same content to their social networking application built on this platform.

Upon setup and configuration, the promotional entity for a point of interest decides the type of content they would like to feed to the online social networking site. When conveying the type of content, say through a configuration user interface, a content management repository template can be auto-generated by the experience capture platform which then links the desired content to the social networking site as described above.

Thus, as shown above, the embodiments herein automatically update an online social networking site that captures a person's experience. The embodiments herein provide a system that enables a point of interest to create and configure its own social networking application without need for software or programming expertise, by using a content management system to invoke a workflow that provides content to a social networking site.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The word "printer" or "image output terminal" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A computer-implemented method comprising:
maintaining at least one point of interest data file within a computer-readable storage medium;
automatically identifying a current user location of a user based on a geographic positioning feature of a portable electronic device that is maintained by said user;
automatically comparing said current user location with said point of interest data file to identify whether said user is located within a predetermined distance of a point of interest maintained within said point of interest data file using a computerized processor that is in communication with said computer-readable storage medium and is in communication with said portable electronic device;
if said user is within second predetermined distance of a point of interest, automatically creating a user status data file using said computerized processor, said user status data file comprising data identifying that said user is currently at said point of interest; and
automatically uploading said user status data file to a social networking web site associated with said user as an activity post associated with said user, using said computerized processor.

2. The computer-implemented method according to claim 1, further comprising capturing, using said portable electronic device, at least one of video, still pictures, and audio simultaneously while identifying said current user location.

3. The computer-implemented method according to claim 2, said creating of said user status data file comprising automatically adding said at least one of video, still pictures and audio to said user status data file.

4. The computer-implemented method according to claim 1, further comprising maintaining, within said computer-readable storage medium, at least one textual data file comprising predetermined textual descriptions of points of interest maintained within said point of interest data file.

5. The computer-implemented method according to claim 4, further comprising automatically merging said predetermined textual descriptions of said points of interest with an identification of said user using said processor to produce a unique string of text describing said user at said point of interest, said creating of said user status data file automatically adding said unique string of text to said user status data file.

6. A computer-implemented method comprising:
maintaining at least one point of interest data file comprising points of interest associated with a vendor within a computer-readable storage medium;
obtaining permission to update social networking web sites from a user visiting a location operated by said vendor;
automatically identifying a current user location of a user based on a geographic positioning feature of a portable electronic device that is maintained within a first predetermined distance from said user;
automatically comparing said current user location with said point of interest data file to identify whether said user is located within a second predetermined distance of a point of interest associated with said vendor maintained within said point of interest data file using a computerized processor that is in communication with said computer-readable storage medium and is in communication with said portable electronic device;

if said user is within said second predetermined distance of a point of interest associated with said vendor, automatically creating a user status data file using said computerized processor, said user status data file comprising data identifying that said user is currently at said point of interest associated with said vendor; and automatically uploading said user status data file to a social networking web site associated with said user as an activity post associated with said user, using said computerized processor.

7. The computer-implemented method according to claim 6, further comprising capturing, using said portable electronic device, at least one of video, still pictures, and audio simultaneously while identifying said current user location.

8. The computer-implemented method according to claim 7, said creating of said user status data file comprising automatically adding said at least one of video, still pictures and audio to said user status data file.

9. The computer-implemented method according to claim 6, further comprising maintaining, within said computer-readable storage medium, at least one textual data file comprising predetermined textual descriptions of points of interest maintained within said point of interest data file.

10. The computer-implemented method according to claim 9, further comprising automatically merging said predetermined textual descriptions of said points of interest with an identification of said user using said processor to produce a unique string of text describing said user at said point of interest, said creating of said user status data file automatically adding said unique string of text to said user status data file.

11. A computerized system comprising:
a computerized processor;
a computer-readable storage medium maintaining at least one point of interest data file, said computer-readable storage medium being in communication with said computerized processor;
a portable electronic device having a geographic positioning feature, said portable electronic device being in communication with said computerized processor and automatically identifying a current user location of a user when said portable electronic device is processed by said user;
said computerized processor automatically comparing said current user location with said point of interest data file to identify whether said user is located within a predetermined distance of a point of interest maintained within said point of interest data file;
if said user is within said predetermined distance of a point of interest, said computerized processor automatically creating a user status data file, said user status data file comprising data identifying that said user is currently at said point of interest; and
said computerized processor automatically uploading said user status data file to a social networking web site associated with said user as an activity post associated with said user, using said computerized processor.

12. The computerized system according to claim 11, said portable electronic device capturing at least one of video, still pictures, and audio simultaneously while identifying said current user location.

13. The computerized system according to claim 12, said computerized processor automatically adding said at least one of video, still pictures and audio to said user status data file.

14. The computerized system according to claim 11, said computer-readable storage medium maintaining at least one textual data file comprising predetermined textual descriptions of points of interest maintained within said point of interest data file.

15. The computerized system according to claim 14, said computerized processor automatically merging said predetermined textual descriptions of said points of interest with an identification of said user to produce a unique string of text describing said user at said point of interest, said computerized processor automatically adding said unique string of text to said user status data file.

16. A computer-readable storage medium tangibly embodying instructions executable by a computer to perform a method comprising:
maintaining at least one point of interest data file within said computer-readable storage medium;
automatically identifying a current user location of a user based on a geographic positioning feature of a portable electronic device that is maintained within a first predetermined distance from said user;
automatically comparing said current user location with said point of interest data file to identify whether said user is located within a second predetermined distance of a point of interest maintained within said point of interest data file;
if said user is within said second predetermined distance of a point of interest, automatically creating a user status data file, said user status data file comprising data identifying that said user is currently at said point of interest; and
automatically uploading said user status data file to a social networking web site associated with said user as an activity post associated with said user.

17. The computer-readable storage medium according to claim 16, further comprising capturing, using said portable electronic device, at least one of video, still pictures, and audio simultaneously while identifying said current user location.

18. The computer-readable storage medium according to claim 17, said creating of said user status data file comprising automatically adding said at least one of video, still pictures and audio to said user status data file.

19. The computer-readable storage medium according to claim 16, further comprising maintaining, within said computer-readable storage medium, at least one textual data file comprising predetermined textual descriptions of points of interest maintained within said point of interest data file.

20. The computer-readable storage medium according to claim 19, further comprising automatically merging said predetermined textual descriptions of said points of interest with an identification of said to produce a unique string of text describing said user at said point of interest, said creating of said user status data file automatically adding said unique string of text to said user status data file.

* * * * *